United States Patent [19]

Johnson et al.

[11] 4,139,359
[45] Feb. 13, 1979

[54] METHOD AND APPARATUS FOR SHAPING GLASS SHEETS BY ROLL FORMING

[75] Inventors: Randall S. Johnson, Bellwood; Terry L. Wolfe, Tyrone, both of Pa.

[73] Assignee: PPG Industries, Inc., Pittsburgh, Pa.

[21] Appl. No.: 847,876

[22] Filed: Nov. 2, 1977

[51] Int. Cl.² .................................................. C03B 23/02
[52] U.S. Cl. ........................................ 65/107; 65/104; 65/106; 65/245; 65/253; 65/273
[58] Field of Search ................ 65/104, 106, 107, 245, 65/253, 273

[56] References Cited

U.S. PATENT DOCUMENTS

| | | | |
|---|---|---|---|
| 2,348,887 | 5/1944 | Drake | 65/273 |
| 3,223,499 | 12/1965 | Cypher et al. | 65/104 |
| 3,226,219 | 12/1965 | Jamnik | 65/170 |
| 3,245,771 | 4/1966 | Jamnik et al. | 65/106 |
| 3,245,772 | 4/1966 | Cypher et al. | 65/111 |
| 3,248,198 | 4/1966 | Jamnik et al. | 65/245 |
| 3,262,768 | 7/1966 | Carson | 65/104 |
| 3,284,182 | 11/1966 | Jamnik | 65/170 |
| 3,332,761 | 7/1967 | Fredley et al. | 65/25 A |
| 3,342,573 | 9/1967 | Fredley et al. | 65/25 A |
| 3,372,016 | 3/1968 | Rahrig et al. | 65/114 |
| 3,396,000 | 8/1968 | Carson et al. | 65/104 |
| 3,420,650 | 1/1969 | Humphreys | 65/94 |
| 3,497,340 | 2/1970 | Dennison et al. | 65/25 A |
| 3,522,029 | 7/1970 | Carson et al. | 65/104 |
| 3,545,951 | 12/1970 | Nedelec | 65/104 |
| 3,701,644 | 10/1972 | Frank | 65/245 X |
| 3,801,298 | 4/1974 | Bezombes | 65/104 |
| 3,820,969 | 6/1974 | Bogrets et al. | 65/184 |
| 3,831,239 | 8/1974 | Hoff et al. | 65/106 X |
| 3,832,153 | 8/1974 | Bezombes | 65/273 X |
| 3,856,499 | 12/1974 | Frank | 65/104 |
| 3,869,269 | 3/1975 | Knapp | 65/106 |
| 3,871,855 | 3/1975 | Frank | 65/273 X |
| 3,881,906 | 5/1975 | Ritter, Jr. et al. | 65/104 |
| 3,891,420 | 6/1974 | Frank | 65/106 |
| 3,929,441 | 12/1975 | Frank | 65/106 |
| 3,934,996 | 1/1976 | Frank | 65/253 X |
| 3,992,181 | 11/1976 | Frank | 65/104 |
| 4,028,086 | 6/1977 | Rahrig et al. | 65/273 |
| 4,043,783 | 8/1977 | Frank | 65/106 |

*Primary Examiner*—Arthur D. Kellogg
*Attorney, Agent, or Firm*—Dennis G. Millman; Edward I. Mates

[57] ABSTRACT

Heat-softened glass sheets are shaped to either simple or compound bends while being continuously conveyed by means of forming rolls having transverse curvature, wherein, in at least the first portion of the bending station, the force of gravity alone causes the glass sheets to sag into substantial conformity with the transverse curvature of the forming rolls. Support for each glass sheet is gradually transferred from straight conveyor rolls to curved forming rolls without vertically reciprocating the rolls. Optionally, at the exit end of the forming station, a set of upper forming rolls having transverse curvature complementary to that of the lower forming rolls may be provided to assure close conformance to the desired curvature. Compound bends may be formed by providing the path defined by the lower forming rolls with a concave curvature in the direction of glass travel.

17 Claims, 18 Drawing Figures

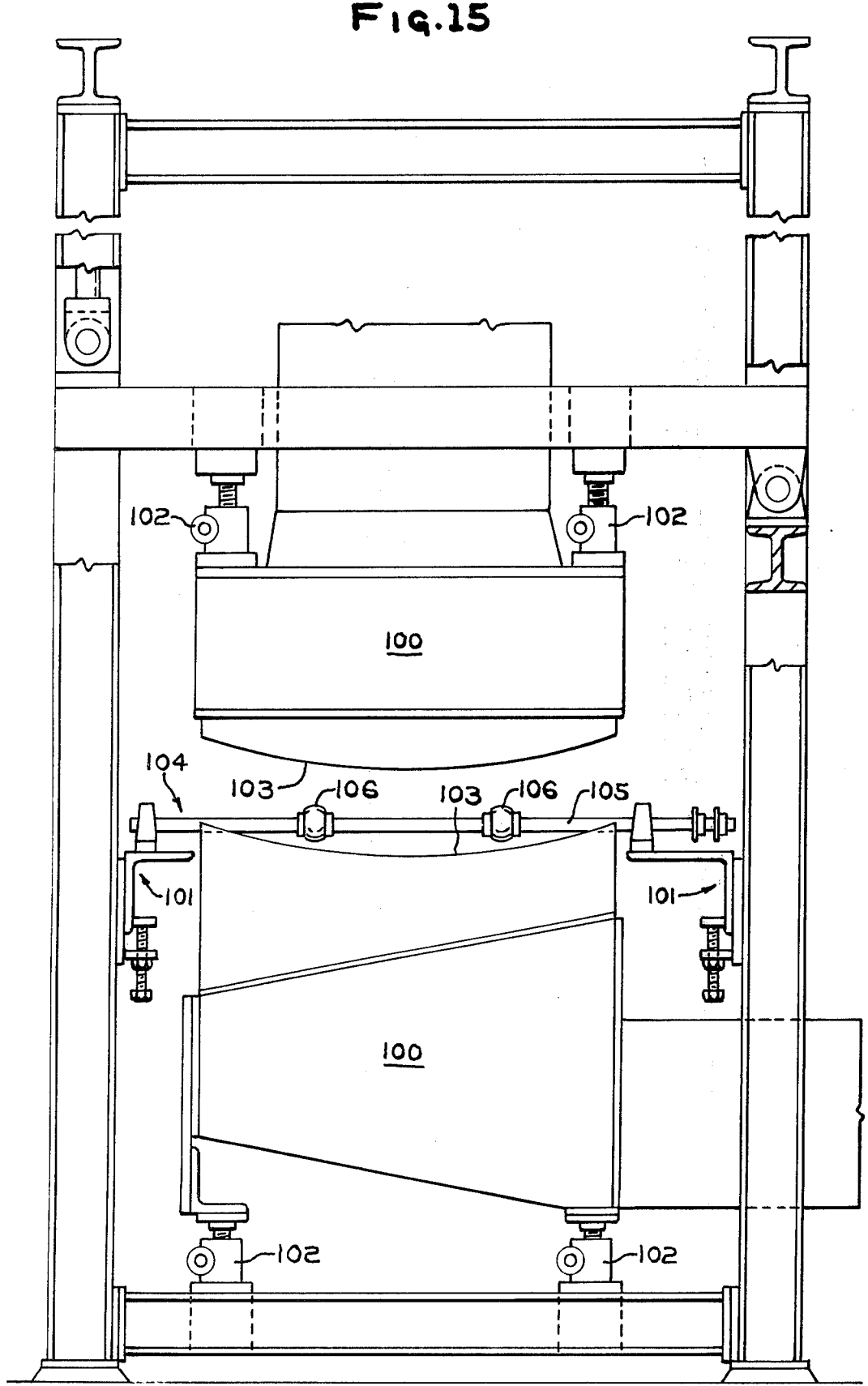

METHOD AND APPARATUS FOR SHAPING GLASS SHEETS BY ROLL FORMING

BACKGROUND OF THE INVENTION

1. Field of the Invention

The present invention relates generally to the production of shaped, tempered sheets of glass and, more particularly, to an improved method of and apparatus for shaping and heat treating relatively thin glass sheets.

Shaped glass sheets are widely used as side windows in vehicles such as automobiles or the like and, to be suitable for such application, flat glass sheets must be shaped to precisely defined curvatures dictated by the shape and outline of the frames defining the window openings into which the glass side windows are installed. It is also important that the side windows meet stringent optical requirements and that the windows be free of optical defects that would tend to interfere with the clear viewing therethrough in their viewing area. During fabrication, glass sheets intended for use as shaped windows in vehicles are subjected to thermal treatment to temper the glass for strengthening the same and increasing the resistance of the shaped window to damage resulting from impact.

The commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. To promote efficient and large scale production, discrete glass sheets are conventionally heated, bent and cooled while being moved continuously along a fixed path and successively through a heating section, a roll forming section, a quenching section and a cooling section. To achieve satisfactory temper, the temperature of the glass sheet must be above a predetermined minimum level so as to maintain the core or interior thereof above a deformation temperature upon being exposed initially to the quenching medium at the quenching section. The residual heat remaining in glass sheets of previous commercial thicknesses, such as those having nominal thicknesses ranging from 4.5 millimeters to 6 millimeters, is generally sufficient after shaping for immediate advancement to the tempering area and exposure to the quenching medium. Thus, the heat initially imparted to a relatively thick glass sheet to bring it to proper temperature for shaping can also be utilized in the final heat treating operation.

However, within the last several years, considerable emphasis has been placed on the use of thinner and thinner glass sheets for automobile side windows as a means of reducing overall weight of the autos as a means to obtain better fuel mileage. This has posed problems in shaping and tempering, due to the lesser ability of the thinner sheets to retain heat and the aforementioned conventional process of bending and treating glass sheets does not lend itself to the processing of these relatively thin sheets, such as those having nominal thicknesses ranging from less than 3 millimeters to 4 millimeters (90 mils to 160 mils). As the thickness of the glass decreases, the rate of heat loss increases and the heat initially imparted to such thin sheets is quickly dissipated upon leaving the heating atmosphere of the furnace and during the relatively cool bending cycle. Attempts to solve these problems by initially overheating the thin glass sheets have not been successful because of the consequent loss of control of the glass shaping process and the degradation of the surface quality of the finished glass as a result of heat stains, roll ripple distortion, and the imposition of roll marks in the surface of the heat-softened glass sheet.

Consequently, roll forming has been developed as a technique for shaping and tempering glass sheets at a high production rate. One of the benefits of the roll forming process is the rapid removal of each individual glass sheet from the heating section or furnace through the shaping section and into the quenching section. In the roll forming method, glass sheets are conveyed without stopping through heating, shaping, and tempering sections along high speed glass sheet conveyor means to drastically reduce the time needed to traverse the distance between the exit of the heating section or furnace to the tempering or quenching section to a minimum, preferably under 5 seconds. Under such circumstances, thin glass sheets can be tempered by quenching without imparting such a high initial temperature at the furnace that shape control and control of surface quality is lost as a consequence of insuring that the temperature at the core of each glass sheet does not cool to below the minimum temperature needed on arrival at the quenching section to assure adequate temper.

Quenching or tempering medium is applied against the opposite major surfaces of the shaped glass sheets. In the past, a movable gate was sometimes provided to minimize back flow of quenching medium into the shaping section. This involved the inclusion of a moving element whose movement must be correlated with the movement of individual glass sheets from a shaping section to a quenching section.

In rool forming as practiced in the prior art, either a continuous glass ribbon or a series of discrete glass sheets is heated to or above the deformation temperature of the glass and passed in a continuous motion through one or more shaping stations where the shape of the glass is changed from a flat configuration to a shaped configuration. Shaping individual glass sheets by roll forming, particularly those of non-rectangular shape having one or both longitudinal side edges extending obliquely of the path of glass sheet movement, is more difficult to perform than roll forming a continuous ribbon, because individual glass sheets have leading edges as well as side edges that are prone to be distorted by a high speed shaping operation, whereas only the side edges of a continuous ribbon are more prone to distortion than the main body of the glass.

Glass sheets have been warped or distorted into different configurations, that is, from flat to curved or from curved to flat by either differentially heating or differentially cooling the opposite glass sheet surfaces. Shaped glass sheets have been subjected to a slight pressure differential to maintain the shaped glass sheets in frictional engagement with shaped rotating conveyor rolls that propel shaped glass sheets through a quenching section where chilling medium is applied to the heated shaped glass sheets rapidly enough to impart a temper thereto. However, thin glass sheets distorted solely by differential heating and/or differential cooling have been known to develop an "oil canning" effect in which the thin distorted glass sheet flexes uncontrollably between metastable states of opposite flexure compared to a flat sheet.

The history of prior art attempts to shape glass sheets continuously without causing the glass sheets to stop for the shaping step so as to obtain as high a production rate of shaped glass sheets as possible and the problems associated with shaping thin glass sheets by differential heating and/or differential cooling will be understood better in the light of a description of the prior art that follows.

2. Description of the Prior Art

Many patents have been issued on roll forming.

Drake U.S. Pat. No. 2,348,887 moves heated glass sheets between a pair of aligned pressure rolls 32 and 33 of cylindrical configuration which force the bottom surfaces of the glass sheets to ride over a series of spaced bending rolls 31 of cylindrical configuration mounted for rotation along spaced lines that extend transversely of a curved path corresponding to the shape desired for the bent glass sheets. The shapes imparted to the moving glass sheets are limited to cylindrical curvatures of uniform radius about an axis transverse to the path of glass movement.

Jamnik U.S. Pat. Nos. 3,226,219 and 3,284,182 and Jamnik and Pelzl U.S. Pat. Nos. 3,245,771 and 3,248,198 form a continuous ribbon of glass into cross-sectional contours of U-shaped configuration by passing the ribbon between consecutive pairs of rolls comprising complementary upper and lower forming rolls of gradually increasing severity of shape. These patents shape continuous ribbons of glass rather than discrete glass sheets.

Humphreys U.S. Pat. No. 3,420,650 forms a continuous ribbon of U-shaped configuration by first tensioning the flat ribbon to adjust its width while hot and then shaping the hot, tensioned ribbon to a U-shaped contour. This patent treats a continuous ribbon rather than discrete glass sheets.

Bogrets U.S. Pat. No. 3,820,969 moves forming elements toward one another to make profiled articles from a ribbon of hot moving glass. The glass is shaped relative to an axis extending along the path of glass movement. The movement of a forming element must be correlated with the movement of the other forming element and with the glass movement for this system to operate effectively.

Ritter et al. U.S. Pat. No. 3,881,906 sags heated glass sheets to intermediate shapes of progressively increasing curvature transverse to their path of movement by conveying said heated glass sheets on successive, contoured, rotating, conveyor rolls of increasing transverse curvature en route to a shaping station. The entire weight of a transversely extending leading element of the glass is borne entirely along the side edge portions of the glass as it transfers from one contoured forming roll to the next. Consequently, the lateral edges kink away from the overall curvature desired and it is necessary to stop each partially shaped glass sheet at a shaping station where its shaping is completed by the inertia gravity method which involves the use of a shaping mold that moves in an upward vertical direction transverse to both the glass movement path and the axes of rotation of the contoured rolls to engage the glass sheet margin while the glass sheet forward movement is stopped. This patent also provides a moving gate between the shaping station and the quenching station to limit back flow of quenching medium from the quenching station to the shaping station. Therefore, this patented apparatus must coordinate the movement of a shaping mold and a gate with the glass sheet movement.

Nedelec U.S. Pat. No. 3,545,951, Bezombes U.S. Pat. No. 3,801,298 and U.S. Pat. No. 3,832,153 and Hoff et al. U.S. Pat. No. 3,831,239 shape moving glass sheets between shaped conveyor rolls that support the lower surface of moving heat-softened glass sheets and a movable upper shaping member of complementary configuration. The apparatus of these patents provides a family of simple curves about a single axis transverse to the path of glass sheet movement. These patents require the shaped conveyor rolls to rotate between different orientations from a flat glass supporting position to a shaped glass supporting position. The change in orientations must be correlated with glass sheet movement to obtain desired results.

Frank U.S. Pat. Nos. 3,701,644; 3,856,499; 3,871,855; 3,891,420; 3,929,441; 3,934,996; 3,992,181 and 4,043,783, and Knapp U.S. Pat. No. 3,869,269 disclose roll forming apparatus capable of shaping a succession of discrete moving glass sheets to either simple shapes provided with one component of shape about either an axis extending longitudinally of the path of glass sheet movement or about an axis extending transversely thereof or compound shapes involving various combinations of two components conforming to said simple shapes. In addition, the roll forming apparatus of this group of patents is capable of shaping glass sheets to either simple or compound shapes involving non-uniform radii of curvature.

This last group of patents provides different inventions incorporated in the most sophisticated system for shaping continuously moving glass sheets to various shapes at the highest rates of production attained prior to the present invention. However, even though this last group of patents provided highest production rates and the greatest variety of simple and compound shapes for glass sheets ever attained, the apparatus comprised movable parts whose movement between spaced apart positions on opposite sides of a path of movement provided by conveyor rolls for glass sheets and glass engaging positions to one side of said conveyor rolls had to be correlated with the glass sheet movement between the movable parts. This correlation required constant monitoring and frequent adjustment of moving parts. In addition, it was necessary to spend considerable time for set up and adjustment of the apparatus when production patterns were changed to insure that the movements of the rotating shaping rolls toward and away from one another correlate properly with the movement of discrete glass sheets therebetween.

Many patents have also issued on thermal warpage of treated glass sheets. These patents use differential heating or cooling or a combination of differential heating and differential cooling against the opposite surfaces of the glass sheet to shape the glass to a different shape from its original shape.

U.S. Pat. No. 3,223,499 to Cypher and Davidson differentially heats the glass sheet while conveyed on a roller hearth to induce an upward warp, then the heat differential is reduced to reduce the warp while continuing to heat the sheet. The heated sheet may be supported on a roller hearth or a gas hearth.

U.S. Pat. No. 3,245,772 to Cypher and Davidson covers thermal warping by differential heating while conveying glass sheets on a roller conveyor extending through a furnace.

U.S. Pat. No. 3,262,768 to Carson temporarily warps a selected edge portion of glass sheet away from an outline mold to which it has been shaped by gravity sagging by differentially applying cooling fluid against the opposite glass sheet surfaces so as to ensure better cooling of the warped edge portion of the shaped glass sheet supported on the outline mold for bending.

U.S. Pat. No. 3,332,761 to Fredley and Sleighter discloses the application of cold air upward at a rate sufficient to provide glass sheet support while annealing glass sheets in spaced relation over a gas hearth.

U.S. Pat. No. 3,342,573 to Fredley and Sleighter discloses supplying a support gas at different pressures at different parts of a gas hearth.

U.S. Pat. No. 3,372,016 to Rahrig, O'Connell and Ferguson discloses differentially heating a glass sheet to bow the sheet upward and then heating from below only to tend to remove the warp that is formed by the initial differential heating.

U.S. Pat. No. 3,396,000 to Carson, Ferguson, Ritter and Hymore discloses quenching opposite surfaces of the glass sheet at preselected different rates to warp a flat sheet to a desired curvature.

U.S. Pat. No. 3,497,340 to Dennison and Rigby discloses a differential rapid cooling of opposite sides of glass sheets through the tempering temperature range to cool the faster cooling side through the temperature tempering range then reducing the faster cooling rate to maintain that side cooled at a lesser cooling rate at a temperature high enough to maintain the glass sheets at a first configuration and then continuing cooling until the sheets are no longer deformable through viscous flow whereby a second configuration forms in the glass sheet.

U.S. Pat. No. 3,522,029 to Carson and Ritter discloses shaping glass sheets by differentially cooling one surface from the central area to an edge area and also shaping glass sheets by differential cooling of the opposite surfaces during movement along a multiple speed conveyor.

U.S. Pat. No. 4,028,086 to Rahrig and Revells discloses passing glass sheets through a quench area where a pressure differential between the top and bottom surfaces is applied to force the glass sheet upward against upper conveyor rolls and to warp or shape the sheet by cooling its bottom surface faster than its top surface.

None of the patents disclose shaping a glass sheet by roll forming to one configuration and changing the configuration by differential cooling.

SUMMARY OF THE INVENTION

The present invention provides a method and apparatus for shaping glass sheets by a roll forming method wherein a series of discrete glass sheets move through a roll forming section of novel construction at a high speed without stopping, thereby producing shaped glass sheets at a high rate of production according to a controlled, predetermined, repeatable program of roll forming. The roll forming section of the present invention comprises a series of rotating rolls that are fixed in position relative to one another so as to minimize the number of moving parts. The rolls are vertically adjustable relative to one another in such a manner as to provide controlled support for the main body of each glass sheet as its lateral edges are lifted gradually relative to the main body of the glass to provide controlled transfer of the glass sheet support from rigidly supported, rotating conveyor rolls of cylindrical configuration to complete support by rigidly supported, shaped, forming rolls of transverse configuration of curved elevation. This gradual transfer of support is believed to provide a better control of the uniformity of glass sheet shaping from sheet to sheet than the control previously provided by roll forming apparatus of the prior art comprising relatively movable shaping rolls that move transversely to the path of glass sheet movement to engage the moving glass sheets as the latter pass between the movable forming rolls.

It has also been found that it is possible to bend glass sheets to a consistent configuration by a combination of roll forming and differential cooling. A first configuration is imparted to the glass sheets during their roll forming and this first configuration is changed to a desired configuration by rapidly cooling the glass sheets having the first configuration to a permanent configuration by applying cooling medium simultaneously against the opposite major surfaces of the sheets at rates sufficiently different to significantly alter the shape imparted to the glass sheets by the initial roll forming step. The initial roll forming step makes it less likely that the distortion imparted to the glass as a consequence of differential cooling will cause the glass sheets to develop the "oil can" effect where the glass flexes out of control between metastable states of curvature in opposite senses relative to a flat glass sheet.

According to a specific embodiment of the present invention to be used with or without the differential cooling arrangement, the apparatus for shaping glass sheets by the roll forming method comprises means to deliver heat-softened glass sheets to a roll forming section one sheet at a time. The means comprises a tunnel-type furnace extending from an entrance to an exit and a roller conveyor comprising a plurality of transversely extending rolls of cylindrical configuration longitudinally spaced from one another from upstream of said furnace entrance to beyond said furnace exit to provide a plurality of spaced, aligned lines of support defining an essentially straight path of movement for a series of said glass sheets through said furnace and comprising means to deliver one glass sheet at a time to a roll forming section.

The roll forming section has two portions. Its first or upstream portion comprises a roller conveyor extension extending in an obliquely downward direction from adjacent the furnace exit and comprising a first series of transversely extending conveyor rolls of cylindrical configuration longitudinally spaced from one another along a common upper tangential plane defining a straight line extending obliquely downward relative to said straight path in a downstream direction from said exit, and a second series of shaped rotating forming rolls, each of which is located intermediate a different adjacent pair of said first series of conveyor rolls.

In the first portion of the roll forming section of the specific embodiment, each forming roll of said second series has a given transversely curved configuration. Each succeeding forming roll of said second series in the first portion of said roll forming section is mounted for rotation on a shaft, and preferably comprises a curved shaping surface of concave elevation. Each forming roll in the first portion of the roll forming section has a curved configuration conforming to the given transverse curvature of concave elevation formed by each of the other forming rolls.

Each shaft that supports a forming roll included in the second series is rigidly supported in bearing housings. Each of the latter is fixed in a unique position relative to a roll support frame so as to support rigidly each successive forming roll in such a position that the curved upper surface of each successive forming roll has a larger portion of its said curved configuration disposed at a higher elevation relative to the obliquely extending straight line defined by the common upper tangential plane of the first series of said conveyor extension rolls of said roller conveyor extension.

The combination of alternate forming rolls and conveyor extension rolls so disposed enables the first portion of the roll forming section to support successive increments of continuously moving glass sheets on straight lines of support at their transverse center portions that gradually diminish in transverse length and on shaped lines of support that gradually increase in length from the side edges to the center transversely of the path taken by the glass sheets through the roll forming section. Supporting part of the mass of the glass sheet on the central portion of the conveyor extension rolls of the first series while periodically increased transverse end portions are supported by rotating forming rolls of the second series controls the glass sheet shaping in a manner that reduces edge kinking as the flat, heat-softened glass sheets are transferred from the furnace to gradually develop a shape transverse to their path of movement that is related to the transverse curvature common to said rotating forming rolls according to a controlled program of shaping without requiring movable forming rolls whose movement transverse to the glass sheet requires coordination with the moving glass sheets.

In the method performed by this apparatus, each glass sheet in the series is heated to at least its deformation temperature. The shaping operation begins with the longitudinal increment of the leading edge thereof supported across its entire width on a flat rotating surface of the first extension conveyor roll of the first series. Then said leading edge increment moves over a first rotating forming roll of the second series, which supports the leading edge increment at its transverse extremities only on its shaped rotating surface. Alternately, the leading edge increment is supported on successively shorter lines of support extending transversely outward from its transverse center portion and successively longer curved lines of support along its transversely opposite side edge portions until the lines of support extending inward from its transverse extremities merge to form at least one continuous curved line of support extending transversely of the path of glass sheet movement and the transverse center support of flat configuration is eliminated altogether. Each longitudinal increment of the glass sheet in turn follows a program of rotating roll support such that at the end of the first portion of the roll forming section an entire transverse dimension of a moving glass sheet is supported by a rotating roll of curved configuration. This gradual transfer of the glass sheet increment by increment from support by cylindrical rolls of the first series to support by rolls of curved configuration of the second series improves the control of the shaping operation and reduces the tendency of the glass sheet to kink at its transverse edges.

According to a specific embodiment of the present invention, the roll forming section also includes a second portion (or downstream portion), which second portion includes a third set of additional lower forming rolls including forming rolls having the same transverse configuration as those in said second series disposed downstream of the aforesaid first portion of said roll forming section. A fourth set of upper forming rolls is included in the second portion of the roll forming section. Each upper forming roll of the fourth series is aligned with a different one of said additional lower forming rolls of the third series. These aligned forming rolls of the third and fourth series are rigidly mounted for rotation in pairs of corresponding forming rolls spaced vertically apart a distance slightly greater than the thickness of the shaped glass sheets.

The upper forming rolls of the fourth series have shapes that are complemental to the shapes of the additional lower forming rolls of the third series. In this manner, the shape that is imparted to the glass sheets moving along the first portion of the roll forming section is maintained within limits defined by the vertical spaces between the corresponding upper and lower forming rolls of the sets of forming rolls. To accomplish this feature, the vertical space between each corresponding upper forming roll and lower forming roll is greater than the glass sheet thickness by an amount that is within the tolerance permitted by the customer for the shaped glass sheets.

The apparatus also includes a quenching section and a cooling section. Additional conveyor rolls having transverse curvatures approximating those of the second and third series of lower forming rolls are adjustably mounted to provide a smooth continuation of the path along which the second and third series of forming rolls are disposed. The additional conveyor rolls are located in the upstream portion of the quenching section to at least a position within the quenching section where the glass sheet surfaces are set.

When the apparatus is used to perform a simple bend about an axis parallel to the path of movement for the glass sheets through the furnace, all of the transversely shaped rolls of the second series in the first portion of said forming section, the lower additional forming rolls of the third series of aligned forming rolls in the second portion of said roll forming section and the additional conveyor rolls in the upstream portion of the quenching section are mounted in a straight horizontal line.

When glass sheets are to be shaped to a compound curvature, the forming rolls of the second series are interspersed among the conveyor rolls of the first series in the first portion of the roll forming section along a downwardly curved first portion of a path of concave elevation. This downwardly curved path is correlated with a longitudinal component of shape to be imparted to the glass sheets transverse to the transverse component imparted by the transverse curvature of the forming rolls. The lower forming rolls of the third series of aligned forming rolls and the additional conveyor rolls in the upstream portion of the quenching section are mounted along a smooth continuation of said curved path of concave elevation. The rigid support of the aforesaid shaped rolls in the roll forming section and in the upstream portion of the quenching section provides spaced rolling support at spaced lines transverse to a smooth continuing longitudinal curve that imparts and maintains a component of longitudinal curvature until the glass surfaces are cooled and hardened sufficiently to preserve the smoothness of the glass surfaces in the upstream portion of the quenching section.

In both embodiments, the close spacing between the aligned rolls of the third and fourth series provides an effective barrier to "blow-back" toward the roll forming section of quenching or tempering medium applied against the opposite major surfaces of the roll formed glass sheets in the quenching section. This barrier is even more effective in case the additional lower forming rolls are supported in closely spaced relation below upper forming rolls of complementary curvature that are disposed along longitudinally curved lines along the path of glass movement as is the case when the forming rolls are adjusted for shaping glass sheets about two mutually perpendicular axes of curvature as is characteristic of a compound or complicated bend. Furthermore, this aspect of this invention protects the glass sheets from exposure to blasts of tempering fluid prematurely by providing barrier means comprising elements that remain fixed in preselected positions and need not be moved in synchronism with the movement of glass sheets into the quenching section.

The forming rolls have diameters that vary considerably over their axial lengths. It is preferable that they be segmented into relatively short lengths. Only selected segments are rigidly fixed to the shaft on which each forming roll is mounted to rotate therewith and the remaining segments are freely rotatable with respect to the shafts. This feature reduces rub marks that are developed in the hot glass sheets when the glass surfaces are so hot and soft that marking due to large differences in peripheral speeds of different portions of the rotating forming rolls causes roll marks. Segmenting the forming rolls to relatively short axial lengths and providing minimum frictional resistance between the free running segments and the shafts results in minimum difference in peripheral speed along the axial length of each forming roll segment. Hence, segmented forming rolls develop less surface damage in the hot glass than continuous shaped rolls. Of course, when the glass surface is relatively cold and hard, it is not necessary to segment the rotating rolls of curved configuration as the relatively hard glass surface is less prone to develop surface damage than hot glass.

It is desirable to lessen the distance between adjacent shaped forming rolls once the glass has assumed a shape approximating the curved configuration of the forming rolls in the first portion of the roll forming section. According to a further embodiment of this invention, certain alternate aligned pairs of segmented upper and additional lower forming rolls omit segments of large diameters to permit closer spacing between adjacent shaped forming rolls in the direction of glass sheet movement. The remaining segments are longitudinally aligned with the segments of forming rolls that are provided with all the shaped segments needed to develop a substantially continuous shaped configuration of desired curvature along the axial length of the shaped forming rolls.

The segments that remain in the additional lower forming rolls of curved configuration of concave transverse curvature are shaped from the ends thereof, whereas the aligned upper forming rolls of complementary convex transverse curvature have certain segments spaced from the axial center portion thereof remaining. The omission of end segments at the lateral extremities of certain additional lower forming rolls of the third series permits the glass sheet transverse edges to sag somewhat to compensate for a minor amount of kink that cannot be avoided completely at the transverse extremities of the glass even with the controlled support provided by the combination of cylindrically shaped additional conveyor rolls and concavely curved forming rolls in the first portion of the forming section.

In this embodiment of the invention, the last two sets of aligned shaped forming rolls in the downstream end of the second portion of the roll forming section have all the shaped segments included to provide substantially continuous rotating shaping surfaces of complementary curvature to assure that each glass sheet arrives at the quenching section in the desired transverse shape and also to insure that the last pair of sets of aligned continuous rolls provide protection against substantial blowback of cool quenching medium from the quenching section back to the first portion of the roll forming section where the upper major surfaces of the glass sheets are exposed to the ambient atmosphere and would be subject to premature cooling that would spoil the temper.

Another feature of this invention is the provision of transverse channel members in the support frame for the roll forming section that facilitates removal and replacement of one roll forming section suitable for fabricating one pattern or one family of similar patterns with another roll forming section adjusted to produce a different pattern or a different family of similar patterns. This feature reduces production time losses to change production patterns compared to prior art production devices.

The various elements of the present invention will be understood more clearly in the light of a description of a specific embodiment of this invention which follows.

DESCRIPTION OF THE DRAWINGS

In the drawings which form part of the description of the specific embodiment of this invention, and wherein like reference numbers are applied to like structural elements.

FIG. 15 is a view similar to FIG. 13 taken across a cooling section beyond the quenching section showing the arrangement of upper and lower cooling nozzles of the slot type and the arrangement of conveyor rolls for transporting the shaped and tempered glass sheet for further cooling by said slot nozzles;

DESCRIPTION OF THE SPECIFIC EMBODIMENT

Figure 1:
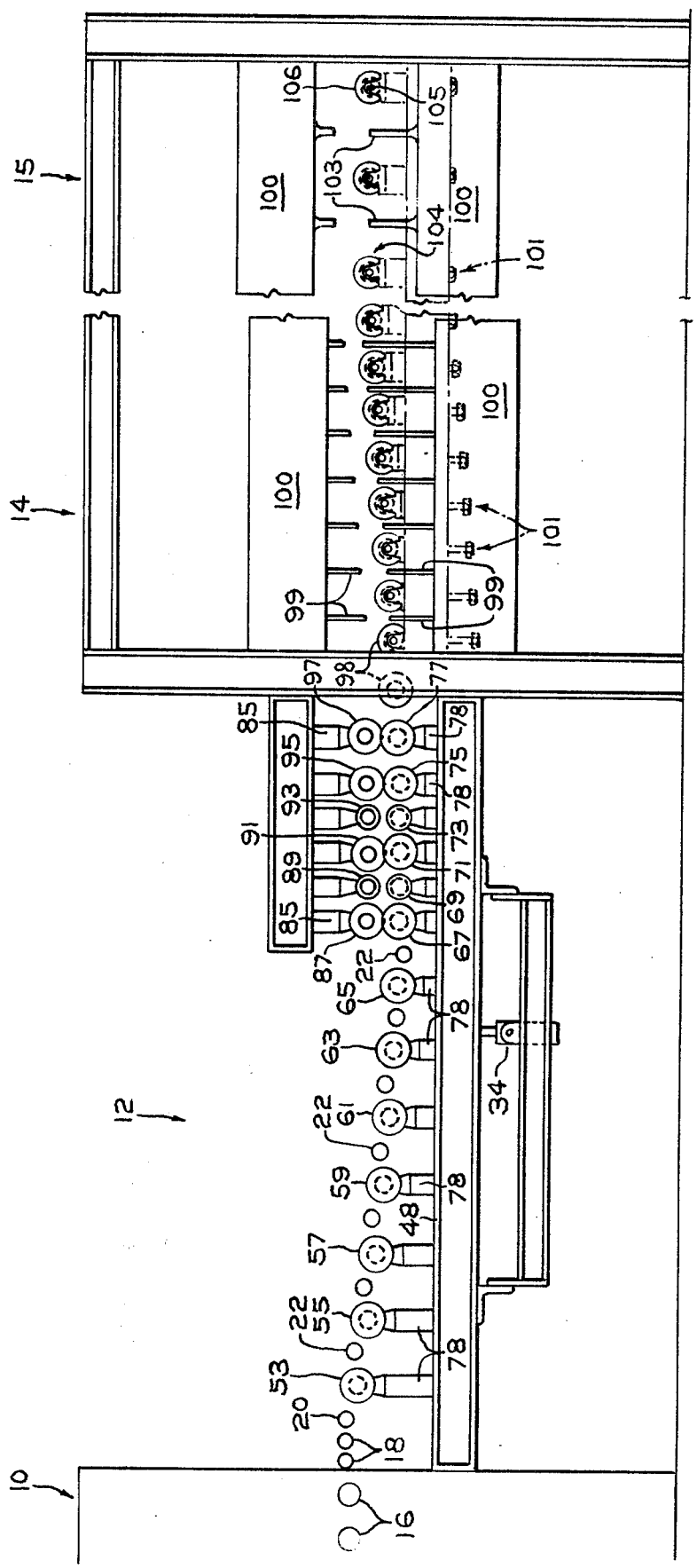
FIG. 1 is a schematic longitudinal assembly view of a specific embodiment of the present invention showing the relative arrangement of conveyor rolls and forming rolls of a roll forming section of apparatus conforming to the present invention and its relation to a heating furnace and quenching and cooling sections.

Referring to the drawings, a specific embodiment of this invention incorporates a tunnel-type furnace 10 followed by a roll forming section 12 composed of two portions followed by a quenching section 14 and a cooling section 15 disposed in closely spaced end to end relation to one another. The furnace includes an orienting and alignment means adjacent the furnace exit and within the furnace. A typical orienting and alignment means that may be used is found in U.S. Pat. No. 3,701,643 to Frank, the description of which is incorporated herein by reference.

A conveyor is provided for the furnace and the first portion of the roll forming section. The conveyor comprises a plurality of furnace conveyor rolls 16, each extending transversely of the furnace in longitudinally spaced relation along the length of the furnace to provide transversely extending, longitudinally spaced rotating lines of support for propelling glass sheets through the furnace, a pair of transfer rolls 18, a pivot roll 20 and a first series of additional conveyor rolls 22 mounted for rotational support on bearing housings 23 and 24 supported on a pair of roll interconnected longitudinal side members 26 and 28 that pivot in unison relative to the pivot roll 20. The rolls 16, 18, 20 and 22 are cylindrical shafts.

Extensions of the shafts for pivot roll 20 and the first series of additional conveyor rolls 22 terminate to one transverse side of the conveyor in chain-driven sprockets 30 which permit the first series of additional conveyor rolls 22 to rotate in unison relative to the longitudinal side members 26 and 28 to which they are interconnected to form a frame-like structure that pivots about a horizontal axis defined by the pivot roll 20 at the upstream end of the pivotable frame-like structure.

A transverse plate 32 interconnects longitudinal side members 26 and 28 and is attached to elevator means 34 in the form of a piston and rod whose upper end is pivotably mounted to a clevis 35 fixed to the bottom of the transverse plate 32. As an alternative, a screw type jack may be used for the elevator means 34. The entire frame-like structure including its rolls 20 and 22 and the interconnected longitudinal side members 26 and 28 is pivotably supported about a pivot axis defined by pivot roll 20 for movement between the upper inoperative or storage position shown in FIG. 2 and the oblique operative orientation depicted in FIG. 1.

Figure 2:
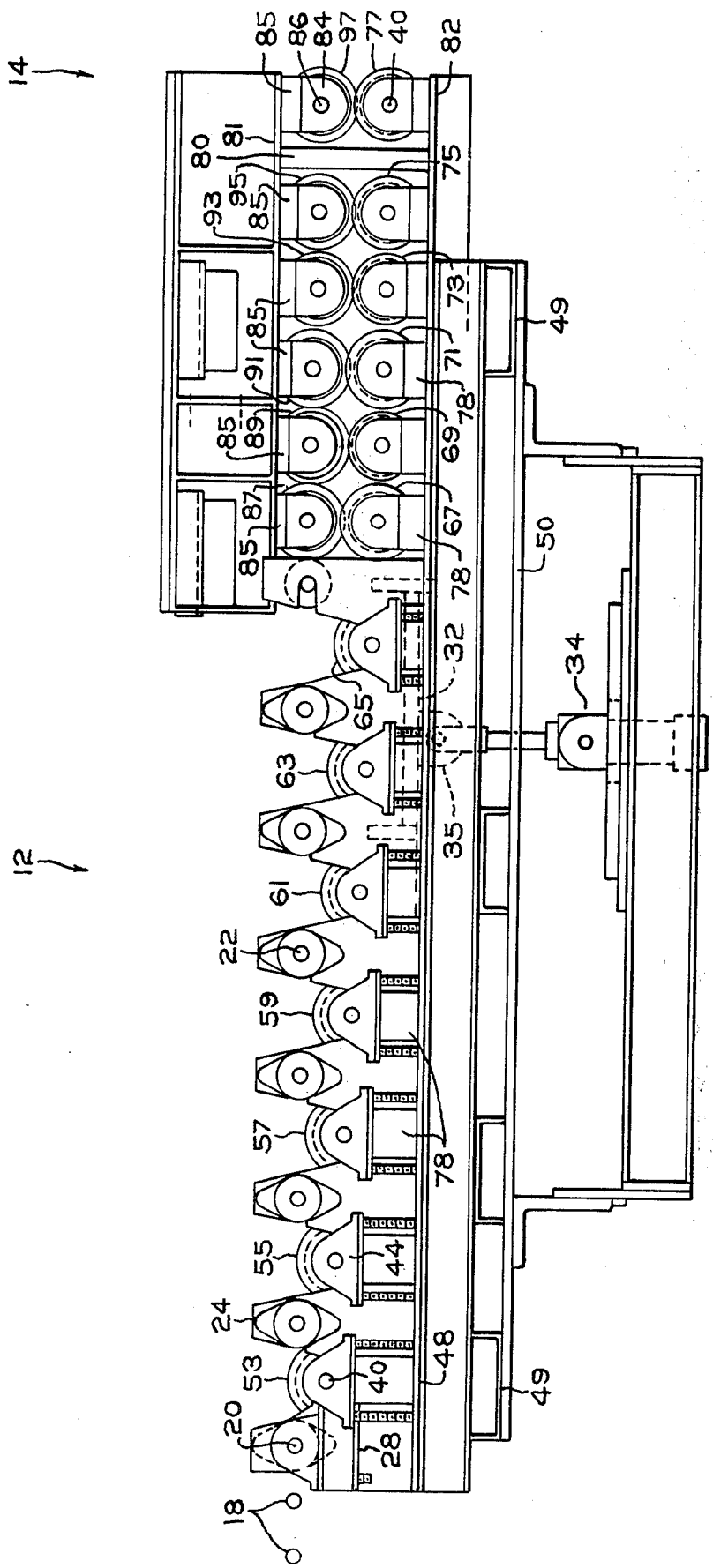
FIG. 2 is an enlarged longitudinal side view of roll forming apparatus as in the present invention with the conveyor extension shown out of the operative position depicted in FIG. 1 to show the details of certain structural elements of the roll forming section more clearly.
Figure 3:
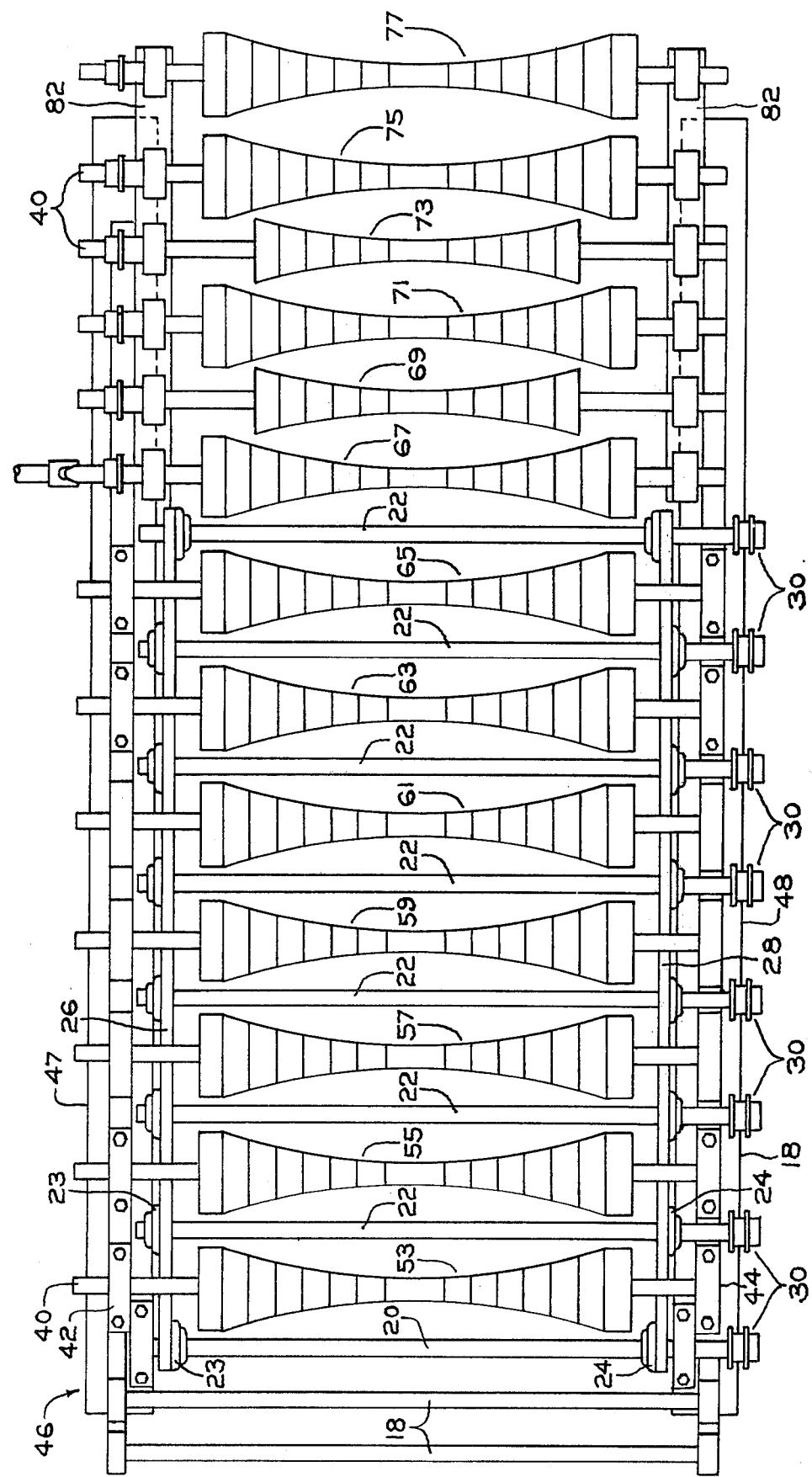
FIG. 3 is an enlarged plan view of the first portion and of the third series of forming rolls of the second portion of roll forming apparatus conforming to the enlarged view of FIG. 2 with certain structural elements omitted to avoid confusion.

The frame-like structure that supports the additional conveyor rolls 22 and pivot roll 20 is shown oriented in a substantially horizontal position in FIG. 2 to facilitate illustration of the structure of an illustrative embodiment. In the operating position for performing the method for which the apparatus of the present invention is designed to perform, the pivotable frame-like structure comprising members 26 and 28 and the rolls 20 and 22 mounted thereto is pivoted into the obliquely downward orientation depicted in FIG. 1. Thus, the pivot roll 20 and the additional conveyor rolls 22 are supported to define an obliquely downwardly extending path beyond the transfer rolls 18 at the furnace exit. The obliquely downward orientation of the additional conveyor rolls 22 relative to the pivot roll 20 is an important feature in obtaining rapid and controlled curvature of glass sheets from a flat to a curved configuration during their transfer from the furnace 10 to the quenching section 14.

The roll forming section 12 comprises a plurality of forming rolls mounted on rotatable shafts 40. Each shaft is driven from a common drive mechanism (not shown) and extends through a pair of bearing brackets 42 and 44. The latter are rigidly mounted to a rigid support frame 46 having longitudinally extending horizontal support members 47 and 48 interconnected by transverse channel-like supports 49. The latter are mounted on a base 50 to which is attached means for supporting the elevator mechanism 34.

The transverse channel-like supports 49 are adapted to receive the fork of a fork lift truck. Whenever a gross pattern change is required, the roll forming section is disconnected from the rest of the equipment (particularly the roll drive mechanism) and carried away by a fork lift truck. Another roll forming section for a different pattern is available for substitution by use of another fork lift truck. It is understood that a fork lift truck is described by way of example and any suitable carrying or lifting mechanism may be used. The substituted roll forming section comprises rigidly supported rolls of a different transverse configuration and/or a different line of support along a curved line having a different longitudinal radius of curvature from that of the replacement roll forming section or along a straight line.

The bearing brackets 42 and 44 are transversely aligned with one another and are spaced longitudinally relative to one another so that the extensions of the shafts of the additional conveyor rolls 22 can pivot with the pivotable frame-like table to an obliquely downward orientation wherein the successive additional conveyor rolls 22 are disposed at successively lower elevations relative to the elevations provided by the forming rolls supported on the shafts 40. Successive forming rolls 53, 55, 57, 59, 61, 63 and 65 comprising a second series of rolls and additional forming rolls 67, 69, 71, 73, 75, and 77 comprising a third series of rolls in the roll forming section are arranged in spaced relation downstream of one another.

Each of the forming rolls 53 through 77 is composed of shaped segments having a transverse curvature of concave elevation transverse to the path defined by the first series of additional conveyor rolls 22. Each segment is composed of a material having a low thermal conductivity, a low coefficient of thermal expansion over a wide range of temperatures and a chemical composition that does not react chemically with glass. In addition, the material selected for the segments is durable over said wide temperature range and one that makes the segments readily shaped or machined to curved contours. An asbestos cement of alumino-silica composition sold by Johns Manville under the trademark of TRANSITE has been found to be most suitable for the segmented rolls of roll forming apparatus useful in the present invention.

Each of the additional conveyor rolls 22 of the first series is disposed approximately midway between adjacent forming rolls of the second series of rolls. The additional conveyor rolls 22, the pivot roll 20 and the transfer rolls 18 are of relatively small diameter and are composed of thin metal shafts (preferably stainless steel) covered with a fiber glass sleeve or tape or with a hard ceramic coating.

Each bearing bracket 42 and 44 and its corresponding horizontal support member 47 and 48 of the rigid support frame 46 is provided with aligned apertures and is spaced above the respective support member by a distance determined by a shim 78 disposed between each horizontal support member 47 and 48 and its corresponding bearing bracket 42 and 44 and provided with aligned apertures to receive attachment bolts and nuts. By providing shims 78 of different thickness along the length of the roll forming section 12, the forming rolls 53 to 77 are supported at spaced transverse lines along a smooth arcuate path of substantially constant radius of curvature correlated with the longitudinal component of shape desired for a glass sheet to be shaped to a compound shape.

Figure 16:
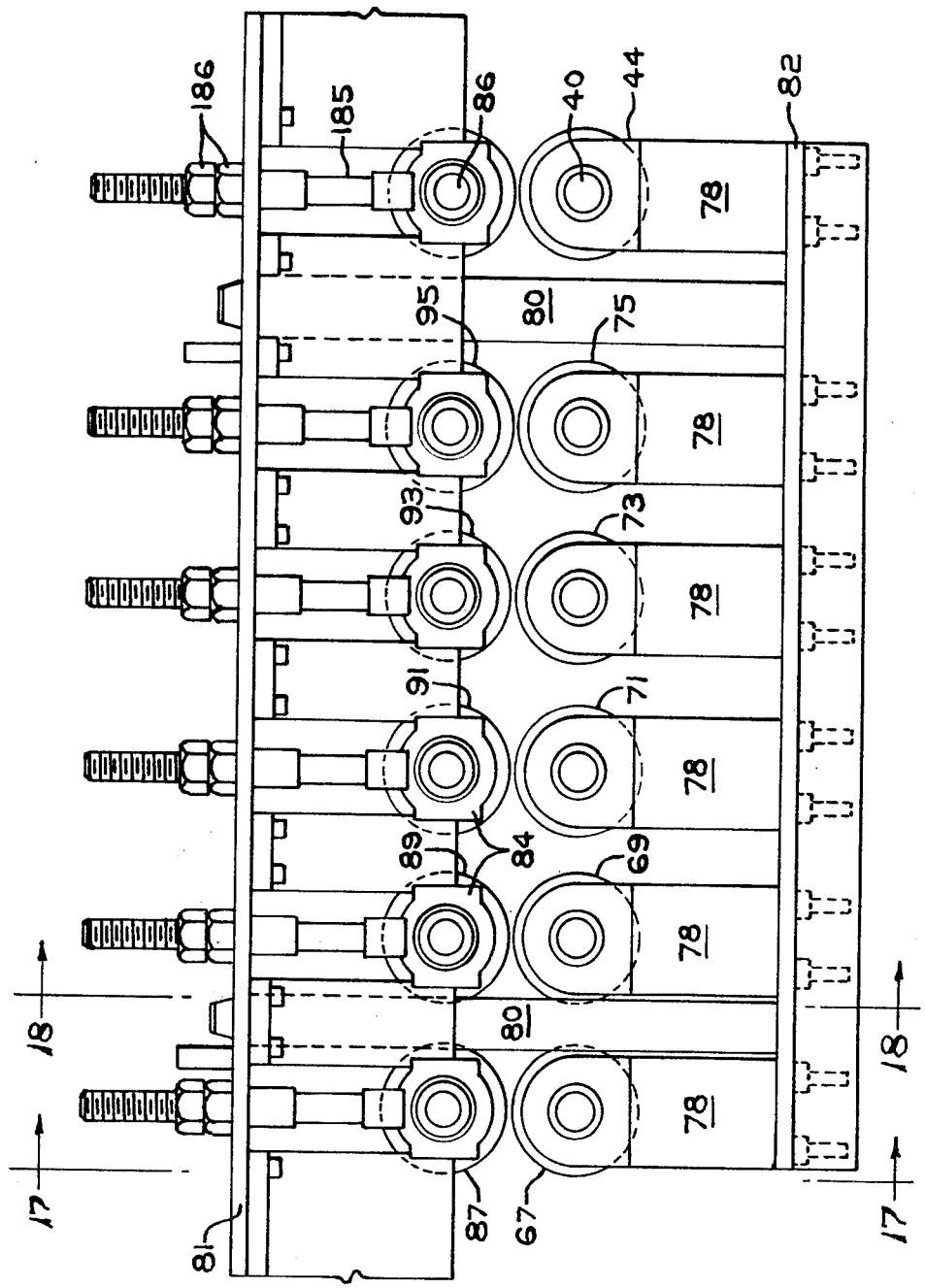
FIG. 16 is a longitudinal end view of a second portion of a second embodiment of a roll forming section wherein glass sheets are shaped to a transversely curved cylindrical bend about an axis extending longitudinally of the path of glass travel.
Figure 17:
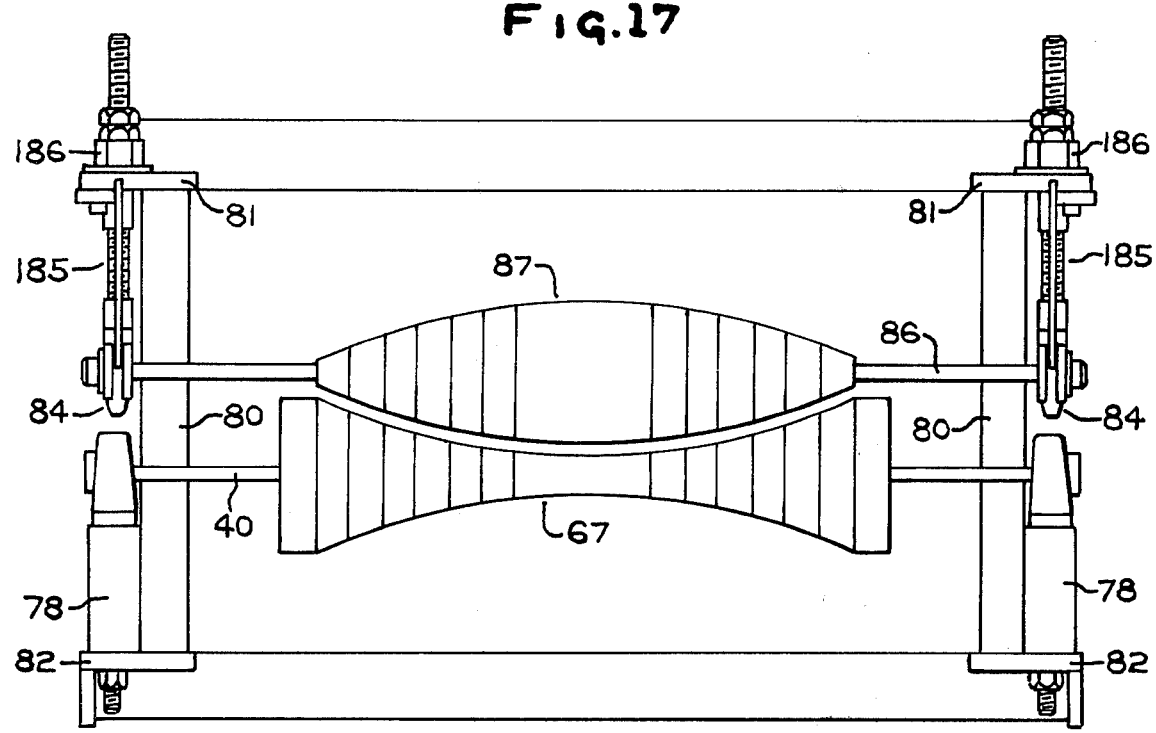
FIG. 17 is a transverse sectional view taken along the lines 17—17 of FIG. 16.
Figure 18:
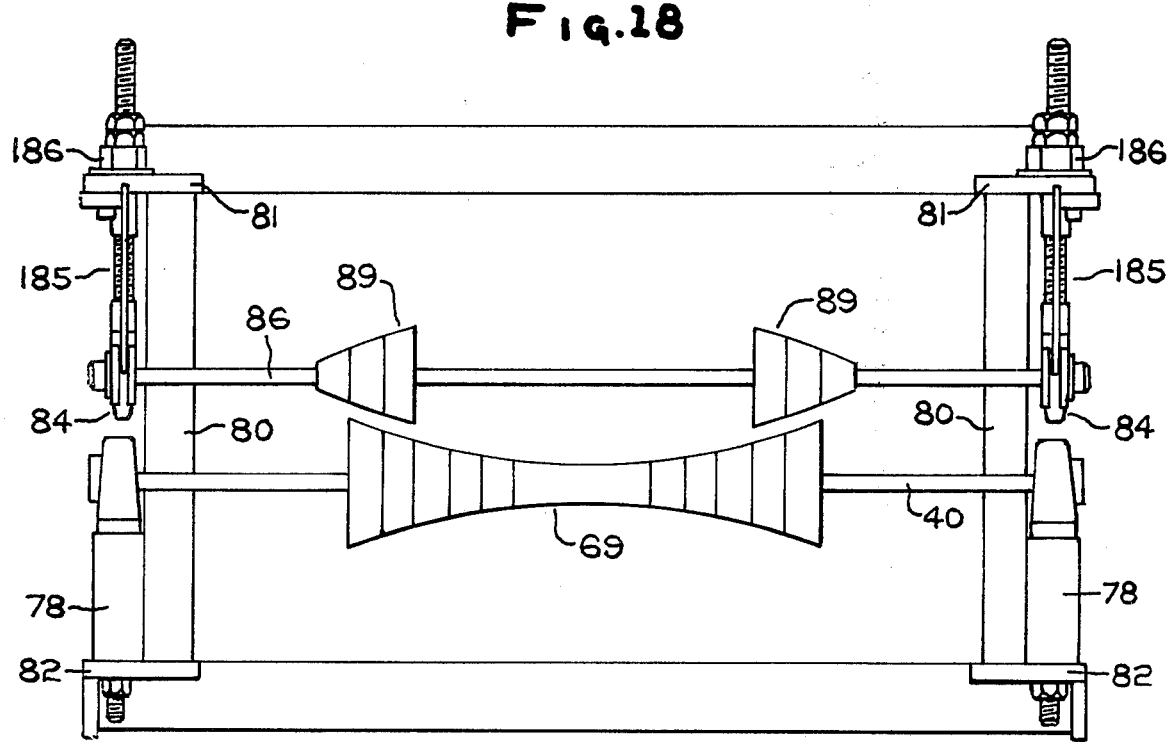
FIG. 18 is a transverse sectional view taken along the lines 18—18 of FIG. 16.

If it is desired to impart a simple bend to the glass sheets comprising a curvature in a direction transverse to the path of glass sheet movement, the thickness of the shims 78 supporting each of the bearing brackets 42 and 44 are equal (as depicted in the embodiment of FIGS. 16 to 18) so as to space each of the bearing brackets a uniform distance above the respective horizontal support members 47 and 48 of the rigid support frame.

The forming section 12 also comprises a plurality of vertical posts 80 interconnecting a pair of upper horizontal longitudinally extending support members 81 with a corresponding pair of lower horizontal members 82. Each of the upper members 81 supports a mounting bracket 84 in spaced relation below the upper longitudinal support members 81 by upper shims 85 of different thicknesses complementary to the thickness of each of the corresponding shims 78. The mounting brackets 84 support shafts 86 of a fourth series of rolls (upper forming rolls 87, 89, 91, 93, 95 and 97) in alignment over the shafts 40 of the corresponding third series of forming rolls 67 to 77 in the second portion of the roll forming section. The upper forming rolls 87 to 97 of the fourth series have a convex outer contour that is complementary to the concave outer contour of the corresponding lower forming rolls 67 to 77 of the third series.

The thicknesses of the shims 85 mounted to the members 82 are inversely related to the thickness of the shims 78 supporting the brackets 44 so that lower forming rolls 67, 69, 71, 73, 75 and 77 of the third series of rolls, which are directly opposite upper forming rolls 87, 89, 91, 93, 95 and 97 of the fourth series of rolls, are supported in uniformly spaced relation below the corresponding upper forming rolls at a spacing slightly more than the thickness of glass sheets passing therebetween.

The driving mechanism for rotating the forming rolls is essentially that provided in the roll forming apparatus of U.S. Pat. No. 3,891,420 to Frank, the description of which is incorporated herein by reference. Independent drives are provided for rotating the additional conveyor rolls 22 of the first series of rolls independently of the drives for the forming rolls 53 to 65 of the second series, for the lower forming rolls 67 to 77 of the third series and for the upper forming rolls 87 to 97 of the fourth series. The four series of rolls are rotated on straight shafts at speeds designed to convey each glass sheet by friction through the roll forming section 12 as promptly as possible.

The uniformity of shaping each sheet treated will be understood from the repetitive program of operation shown in FIGS. 4 to 12. In particular, FIGS. 4 to 10 disclose the program of operation of the arrangement of the respective forming rolls 53 through 65 inclusive of the second series of rolls with respect to the additional conveyor rolls 22 of the first series as a representative glass sheet traverses the first portion of the roll forming section.

Figure 4:
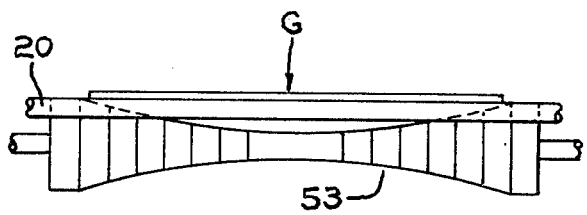
FIGS. 4 to 12 show schematic views taken across different increments of the roll forming section showing how a glass sheet is supported by various combinations of forming rolls and conveyor rolls as it is conveyed through a roll forming section during the shaping of a glass sheet.

As each longitudinal increment of the representative glass sheet G passes over the rotating pivot roll 20, the latter momentarily engages the entire width of the sheet and propels the sheet downstream. A short distance downstream, only the longitudinal side edges of the glass sheet increment are momentarily engaged by the traversely curved concave surface of the first forming roll 53. This is shown in FIG. 4. In the meantime, a succeeding longitudinal increment is momentarily supported across the transverse dimension of the sheet by rotating pivot roll 20.

Since each of the succeeding additional conveyor rolls 22 of the first series of rolls is at a lower elevation than its immediately preceding additional conveyor roll, and since the forming rolls of said second series of forming rolls in the first portion of the roll forming section 12 are disposed along an arcuate path of concave elevation that is not as steep in declining elevation as the obliquely downward extending straight path defined by the spaced additional rotating conveyor rolls 22, it will be obvious that gradually the glass sheet is transferred by longitudinal increments from momentary support on straight lines of support across the entire transverse dimension to a combination of momentary supports comprising curved lines of momentary support of gradually increasing length along an increasing portion of its longitudinal side edge portions extending transversely inward thereof and gradually decreasing straight lines of momentary support extending gradually decreasing distances transversely of its centrally disposed area.

Figure 5:
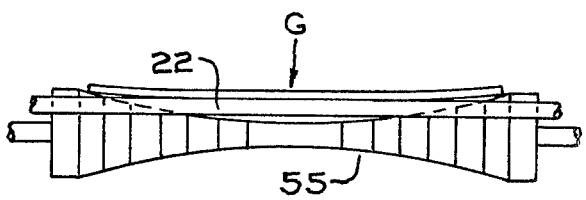
Figure 6:
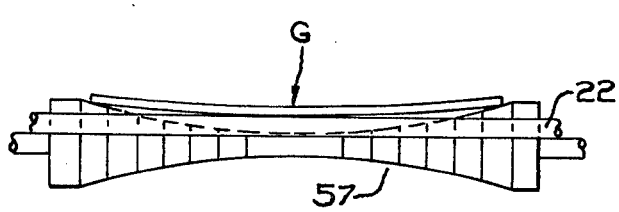

When the longitudinal increment of the glass sheet G reaches the first additional conveyor roll 22, it is momentarily supported along a substantial portion of its transverse dimension along its central portion on the first additional rotating conveyor roll 22. A short distance downstream therefrom a slightly longer transverse extremity portion at each side edge of the glass sheet is momentarily supported on the concavely curved rotating surface of the second forming roll 55 than was supported upstream on the first forming roll 53, as seen in FIG. 5. The second additional conveyor roll 22 then provides a shorter straight line of momentary support along a smaller central portion at a short distance downstream from rotating forming roll 55, and shortly afterward, rotating forming roll 57 provides a transversely curved support in momentary rolling engagement for a slightly larger transverse end portion at each transversely opposite end portion of the glass sheet increment than was provided by forming roll 55, as seen in FIG. 6.

Figure 7:
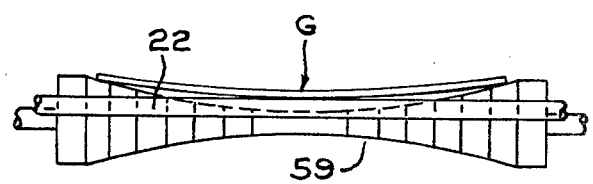
Figure 8:
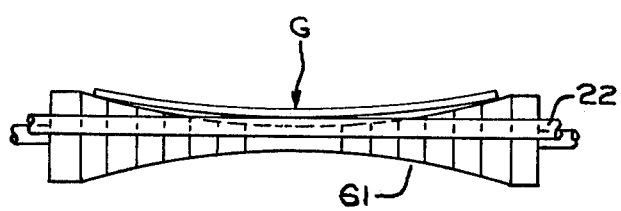

The succeeding additional rotating conveyor roll 22 momentarily supports a still slightly shorter central transverse portion of the glass sheet increment than the preceding additional conveyor roll 22. FIG. 7 shows how the rotating forming roll 59 provides longer curved lines of momentary support along the opposite transverse extremities for the glass sheet increment than forming roll 57. After a still shorter momentary straight line transverse central support by the additional rotating conveyor roll between forming rolls 59 and 61, rotating forming roll 61 provides curved line momentary supports for larger transverse extremity portions of the glass sheet increment than forming roll 59. FIG. 8 shows that still longer curved lines of momentary transverse support are provided by rotating forming roll 61 than that provided by rotating forming roll 59 with corresponding shorter straight line momentary central support provided by the additional conveyor roll therebetween.

Figure 9:
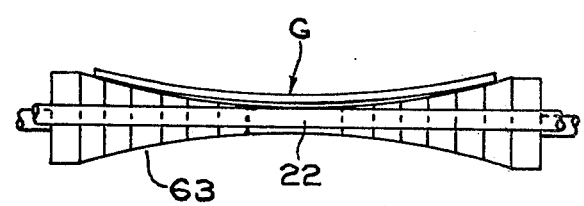
Figure 10:
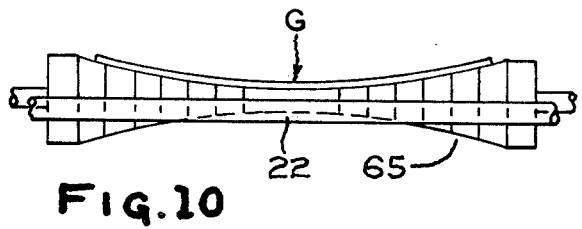

By the time the glass sheet reaches the conveyor roll 22 between forming roll 61 and forming roll 63, only a small central portion is momentarily supported on a straight line of support by the transversely extending additional conveyor roll 22. FIG. 9 shows the increment of the almost completely shaped glass sheet almost entirely supported momentarily along transversely inward curved lines of support formed on rotating forming roll 63 with its transverse center portion just out of contact with roll 63. By the time the glass sheet increment reaches rotating forming roll 65, the entire transverse dimension of the glass sheet G is momentarily supported on the transversely curved shaping surface of forming roll 65 after it has passed above the last additional conveyor roll 22 between rotating forming rolls 63 and 65 completely out of contact with the last additional conveyor roll 22. This arrangement is shown in FIG. 10.

It is understood that the number of shaped rolls in the first portion of the roll forming section illustrated is exemplary, and the number may be increased or decreased depending on many factors such as size and thickness of glass sheets processed, complexity of bend, etc. Also, the downward slope of the common upper tangent of additional conveyor rolls 22 may be adjusted in view of these factors.

Since a considerable portion of the central area of the glass sheet is simultaneously supported momentarily while the forming rolls begin to engage the glass sheets momentarily at their transverse end portions in the first portion of the roll forming section, the amount of edge kink imparted to the glass sheets is controlled to a considerable extent compared to roll forming practices of the prior art where the entire mass of the glass sheet was supported initially on the transverse edge portions rolling over the curved shaping rolls.

Figure 11:
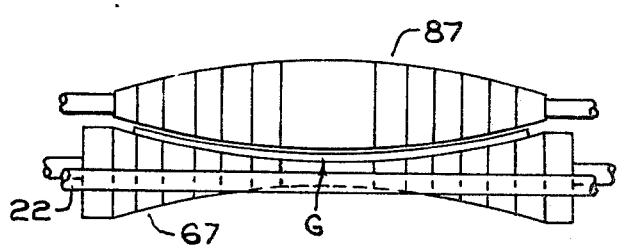
Figure 12:
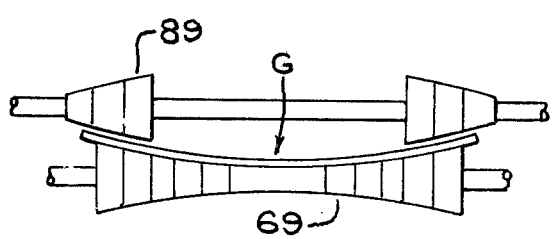

As the shaped glass sheet enters the second portion of the forming section, its entire width is supported momentarily on the first additional rotating forming roll 67 of the third series in closely spaced relation below upper forming roll 87 of the fourth series as depicted in FIG. 11. When the glass sheet reaches the position between upper forming roll 89 and lower forming roll 69, its central portion is supported momentarily on the central segments of lower forming roll 69 with its transverse edge portions unsupported from below in close relation below the transverse outer segments of upper forming roll 89 as depicted in FIG. 12. The shaped glass sheet increments are supported momentarily on shaped lower forming rolls 71 to 77 of the third series in closely spaced relation below corresponding upper forming rolls 91 to 97 of the fourth series as the glass sheet traverses the second portion of the forming section 12.

The shaped glass sheet is thus supported momentarily by increments in the second portion of the forming section on additional shaped rotating forming rolls 67, 69, 71, 73, 75 and 77 in closely spaced relation below upper rotating forming rolls 87, 89, 91, 93, 95 and 97 of complementary curvature disposed above the glass sheet in vertical alignment over the corresponding additional forming rolls 67 to 77. The transverse curvature of concave elevation of the additional forming rolls 67 to 77 of the third series of rolls is the same transverse curvature as that common to the immediately preceding shaping rolls 53 to 65 of the second series of rolls in the first portion of the shaping section.

All the shaping rolls are segmented in both the first and second portions of the shaping section. Such segmenting reduces the severity and even the incidence of roll marks compared to marks obtained using continuous forming rolls.

One purpose of providing upper and lower shaping rolls of complementary curvature in the second portion of the roll forming section is to maintain the shape of the glass that is imparted by successive momentary supports by the first and second series of rolls in the first half of the forming section 12 within tolerance limits. It has been found that it is unnecessary to provide all the segments of each forming roll and it has also been found to be desirable to maintain the forming rolls of the third and fourth series in a closer longitudinally spaced relation to one another than is possible if all the forming rolls of the third and fourth series had all their segments. Therefore, alternate forming rolls in the second portion of the forming section 12, such as rolls 69 and 89, are provided with only certain smaller diameter segments so as to permit the glass shape imparted by forming rolls 53 to 65 of the second series of rolls to be maintained within desired tolerance. For example, the upper forming rolls 89 and 93 are provided without centrally disposed larger diameter segments and the transverse outer segments of the lower forming rolls 69 and 83 are omitted.

The opposing forming rolls 67 and 87 are of complementary curvature and are disposed at a distance relative to one another slightly more than the thickness of glass sheets undergoing processing. This is to limit any distortion in shape of the shaped glass sheet as it passes through the second portion of the forming station 12. The same is true of the spacing between forming rolls 69 and 89, between forming rolls 71 and 91, between forming rolls 73 and 93, between forming rolls 75 and 95, and between forming rolls 77 and 97. Also, the downstream pair of forming rolls 77 and 97 effectively reduce the back flow of quenching medium for the quenching section by virtue of their close vertical spacing.

The forming rolls in the first portion of the forming section 12 are mounted on shafts 7 inches (18 centimeters) apart. Removing the largest diameter segments from alternate forming rolls in the second portion permits their arrangement on shafts only 6 inches (15 centimeters) apart or less. The closer spacing helps maintain the longitudinal shape component imparted to glass sheets conveyed over rotating forming rolls arranged along a curved path.

Another benefit of having the largest diameter segments removed from certain additional lower forming rolls is that the transverse extremities of each increment are unsupported for two relatively long time intervals compared to the shorter time intervals between momentary adjacent rotating supports provided centrally by the central segments. Therefore, the transverse end portions of the glass sheets are free to sag somewhat in relation to their supported center portions. These momentary opportunities for transverse edge sagging compensate for any minimal edge kink that is imparted onto the glass sheets even though the transverse edges do not bear the entire mass of the glass sheets. Furthermore, there are two complete lower forming rolls 75 and 77 that support the glass sheet increments across their entire width downstream of rolls 69 and 73 that permit increased duration of transverse edge sag. Rolls 75 and 77 are immediately before the entrance to the quenching section. Therefore, neither edge kink nor excessive edge sag is a problem for glass sheets entering the quenching section after such a program of support in the second portion.

Figure 14:
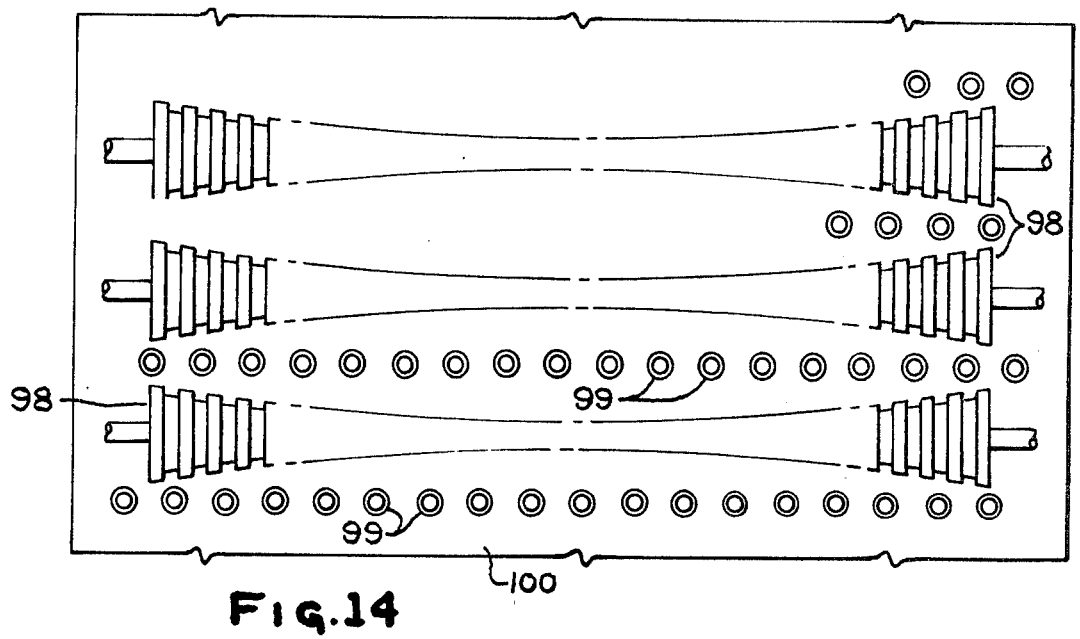
FIG. 14 is a plan view across a series of adjacent rows of nozzles showing their arrangement in one portion of the quenching section forming part of the apparatus illustrating the present invention.
Figure 13:
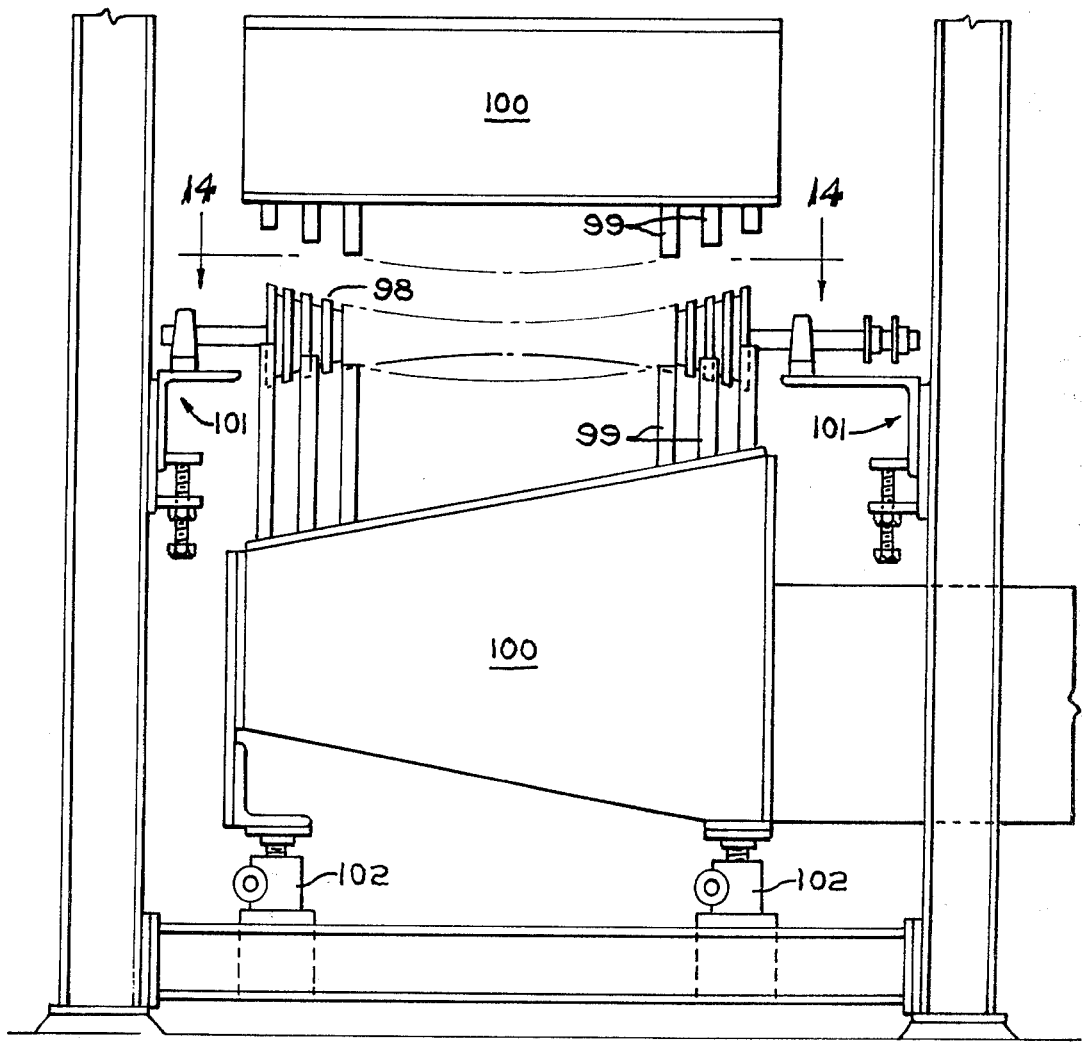
FIG. 13 is a transverse elevational view of the upstream portion of a quenching section where the shaped glass is chilled rapidly to impart a temper and supported in a manner to avoid losing one or both components of curvature.

Beyond the forming section 12 there is a quenching section 14. In the quenching section 14, a succession of grooved conveyor rolls 98 transversely shaped in concave elevation similar to forming rolls 53 to 77 (except for rolls 69 and 73) is provided. The conveyor rolls 98 thus provide additional curved supports for the shaped glass sheets delivered to the quenching section 14. The quenching section 14 is depicted in cross section in FIG. 13 and in plan in FIG. 14 and a further cooling section 15 is depicted in FIG. 15. The shaped conveyor rolls 98 in the first portion of the quenching section 14 are provided with one quarter inch deep grooves one quarter inch wide spaced along the axial length of the quench conveyor roll to permit the lower surface of each shaped glass sheet to be exposed to blasts of air from nozzles 99 disposed intermediate adjacent shaped conveyor rolls 98.

The conveyor rolls 98 in at least the upstream portion of the quenching section 15 are adjustably mounted on straight shafts disposed along a continuation of the curved path of constant radius provided by the forming rolls of the second and third series of rolls. The arcuate path taken by the shaped glass sheets is uninterrupted from the roll forming section into the upstream portion of the quenching section until a location is reached where the surfaces of each conveyed glass sheet are sufficiently hard to retain its shape when tilted onto the remainder of the conveyor extending horizontally at the same elevation as the rolls in the furnace 10.

In the first portion of the quenching section 14, round nozzles 99 are provided in transversely extending rows located both above and below the shaped conveyor rolls 98 to impart air blasts according to a pattern against the upper and lower surfaces of glass sheets moving along the shaped, grooved rolls 98. Each of the nozzles 99 communicates with an upper or lower plenum chamber 100. The amount each of the round nozzles 99 extends from its associated plenum chamber 100 is determined by an arc having an average radius of curvature contemplated for the transverse curvatures of the sheets processed. Apparatus designed to process glass sheets having transverse curvatures of 40 inches (1 meter) to 75 inches (1.9 meters) have the nozzles in each row terminate in a curved line from an arc of a circle of approximately 60 inch (1.5 meters) radius. The arc is of concave elevation. This arrangement spaces the end of each nozzle 99 relative to the wall of the associated plenum chamber 100 that faces a glass sheet surface so that the nozzle to glass distance is substantially uniform across the transverse dimension of the sheet even when the sheet has a radius of curvature different than 60 inches (1.5 meters).

Means 101 (see FIGS. 13 and 15) is provided for supporting and adjusting the vertical positions of angles supporting bearing housings for the grooved rolls 98 so that the curved path formed by forming rolls 53 to 77 can be continued uninterrupted into the quenching section 14 along rolls 98. Additional means 102 is provided to support and adjust the vertical positions of the upper and lower plenum chambers 100 so as to facilitate any repair and maintenance work and to provide gross adjustment of nozzle to glass distance. Such adjustment means are well known in the art and need not be further discussed at this point.

The individual round nozzles 99 in the illustrative embodiment are arranged in 48 transversely extending rows longitudinally spaced 4 inches (10 centimeters) apart. The nozzles in each row of the first six rows are approximately 0.622 inches (1.6 centimeters) in diameter and the nozzles 99 in the remaining 42 rows are one-half inch (1.3 centimeters) in diameter. The nozzles in each row are spaced approximately 1.5 inches (3.8 centimeters) center to center along the length of each row extending transverse to the glass sheet path. The rows extend transverse to the path of glass movement through the quenching section and adjacent rows of round nozzles are disposed in offset relation to the rows of the immediately preceding and the immediately succeeding row of nozzles. Upper and bottom rows face one another in nozzle to nozzle alignment.

Adequate temper has been obtained from plenum pressures of 12 ounces per square inch (5000 pascals) for the upper plenums and 8 ounces per square inch (3300 pascals) for the lower plenums in processing glass sheets 5/32 inch (4 millimeters) thick. A slight net downward pressure is helpful in keeping thin glass sheets in frictional relation to the shaped rotating conveyor rolls in the quenching section so as to move the glass sheets uniformly through the quenching section 14 and avoid "chattering" of the glass sheets as they are conveyed along the conveyor.

At the cooling section 15, additional plenum chambers 100 are provided, each terminating in slot-type nozzles 103, having apertured open ends facing the path taken by the glass sheets and transversely shaped to conform generally to the shape defined by the ends of the transverse rows of nozzles which approximates the shape desired for the glass sheet. A cross sectional view of the end portion of the cooling section showing how the nozzles 103 are arranged relative to the conveyor rolls is depicted in FIG. 15. In the illustrative embodiment, transversely extending slots 3/16 inch (4.7 millimeters) wide are longitudinally spaced 8 inches (20 centimeters) apart.

So-called doughnut rolls 104, which comprise central shafts 105 of ¾ inch (1.9 centimeters) diameter and a pair of doughnut shaped members 106 about 2 inches (5 centimeters) in diameter are mounted on the central shafts in axially spaced relation in adjustable fixed positions along the shafts so as to support shaped glass sheets in spaced relation to the shafts. Shafts 105 extend transversely approximately midway between adjacent slot nozzles. Such arrangements are well known in the glass tempering art and specific illustrative operating conditions are disclosed to provide a full disclosure of the present invention.

It will be seen from the foregoing description that a series of glass sheets, after being conveyed through a furnace, is delivered at a deformation temperature to a roll forming section where glass sheet increments are alternately supported momentarily on curved forming rolls and flat additional conveyor rolls so as to gradually impart a transverse curvature thereto. In addition, if the shims supporting the bearing brackets on which the forming roll shafts are mounted are of different thicknesses, and the adjustment means 101 for the quenching rolls 98 are properly adjusted, then the succession of forming rolls and quench conveyor rolls in the upstream portion of the quenching section are disposed along a smoothly curved path. The forming rolls of the second series impress a longitudinal curvature on the glass sheet moving from roll to roll. As the glass sheets pass through the second portion of the roll forming section, the longitudinal shape impressed by the first series of rolls in the first portion is maintained with edge kinking minimized by larger intervals between certain successive edge supports and the glass sheets are then subjected to immediate quenching while supported on shaped quench conveyor rolls 98 along a continuation of the smoothly curved line of longitudinal curvature between blasts of air disposed against the upper and lower surfaces of the shaped glass sheets. During initial exposure to quench air at the quenching section the glass sheets are first supported on shaped rotating quench conveyor rolls 98 that extend in a further extension of said curved path, and then supported in a horizontal line parallel to the horizontal line of the conveyor rolls 16 in the furnace when the glass surfaces have hardened sufficiently to permit their tilting to a horizontal plane of support.

Flat glass sheets have been shaped and tempered at a rate of over 800 sheets per hour using this apparatus. This has been accomplished without requiring any movement of the forming rolls except for rotation. Glass sheets are conveyed at about 700 inches per minute (18 meters per minute) through the furnace and 1400 inches per minute (36 meters per minute) through the forming section and the quenching section. Glass sheets are heated to attain a temperature in the range of approximately 1150° F. to 1220° F. (620° C. to 660° C.) at the furnace exit and are cooled naturally for about 4 seconds while traversing the forming section which occupies the space between the furnace exit and the first row of nozzles in the quenching section.

In a typical production operation using the equipment described to produce over 800 pieces per hour, air is supplied at a nominal flow of about 1000 standard cubic feet per minute per square foot (5 cubic meters per second per square meter) of plenum at a total pressure of 20 ounces per square inch (8600 pascals) to the upper surface and 18 ounces per square inch (7700 pascals) to the lower surface through the first six rows of round nozzles, then at a nominal flow of about 500 standard cubic feet per minute per square foot (2.5 cubic meters per second per square meter) of plenum at a pressure of 21 ounces per square inch (9000 pascals) against the upper surface and 18 ounces per square inch of plenum (7700 pascals) against the lower surface through the next 18 rows. The temper is well established at this point.

Additional air blasts are applied at a nominal flow of about 400 standard cubic feet per minute per square foot (2 cubic meters per second per square meter) of plenum at a pressure of 20 ounces per square inch (8600 pascals) against the upper surface and a pressure of 18 ounces per square inch (7700 pascals) against the lower surface through the remaining 24 rows of round nozzles. An additional flow at the nominal rate of 200 standard cubic feet per minute per square foot (1 cubic meter per second per square meter) of plenum is then applied through the slot nozzles at a pressure of 8 to 10 ounces per square inch (3400 to 4300 pascals) against the opposite surfaces to continue cooling the glass sheets in the cooling section 15.

Glass sheets having a nominal thickness of 5/32 inch (4 millimeters) so treated did not have an "oil canning" problem and met all the requirements for a break pattern needed to meet the automotive code. For example, the largest fragment of fractured tempered glass cannot weigh more than 4.25 grams or it fails to meet the code. Typical break patterns show 2 grams to 2.5 grams weight for the largest particle.

When flat glass sheets are heated to above their distortion temperature and then cooled rapidly to below their strain point, the glass is tempered. When the glass sheets are cooled so that their opposite surfaces cool at different times to below the strain point, the tempered sheets are distorted. However, in thin glass sheets, the warped glass is likely to flex between metastable states even when the opposite surfaces are chilled at drastically different rates. This tendency to flex has not been observed with glass sheets that are first shaped by roll forming to a curved configuration and then altered in shape by differential cooling from above the deformation temperature to below the strain point of the glass.

A typical production operation uses the equipment described to shape glass sheets to one configuration by roll forming using forming rolls having a transverse radius of curvature of 75 inches (1.9 meters) and with their shafts arranged along a longitudinally curved path having a radius of 3600 inches (93 meters) (including quench conveyor rolls at the upstream portion of the quenching section) in a smooth continuous curved path followed by differential cooling. In this operation, air is supplied at a plenum pressure of 20 ounces per square inch (8600 pascals) to the upper surface and 5 ounces per square inch (2200 pascals) to the lower surface through the first six rows of round nozzles to impart a temper and distort the glass sheet to a configuration significantly different from the first configuration. Further cooling is accomplished with air supplied at a plenum pressure of 21 ounces per square inch (9000 pascals) against the upper surface and 18 ounces per square inch of plenum (7700 pascals) against the lower surface through the next 18 rows as the glass sheet is conveyed rapidly between said nozzles. Additional air blasts are applied at a plenum pressure of 20 ounces per square inch (8600 pascals) against the upper surface and a pressure of 18 ounces per square inch (7700 pascals) against the lower surface as the shaped, tempered glass sheet is conveyed between the remaining 24 pairs of rows of upper and lower nozzles of round cross-section. An additional flow of air is then applied through the slot nozzles at a plenum pressure of 8 to 10 ounces per square inch (3400 to 4300 pascals) against the opposite surfaces to continue cooling the glass sheets.

Glass sheets having a nominal thickness of 3/16 inch (5 millimeters) so treated met all the requirements for a break pattern of the automotive code, being considerably less than 2 grams. No "oil canning" problems were noted. Furthermore, glass sheets shaped to a first configuration by passing over rotating forming rolls shaped to provide a 75 inch (1.9 meters) radius of curvature transverse to the path of movement about an axis parallel to the path of movement and arranged along a sweep line having a radius of curvature of 3600 inches (93 meters) along the path of movement were changed in shape as a result of the differential cooling treatment described previously to develop a curvature having a 69 inch (1.75 meters) traverse radius of curvature about an axis extending longitudinally of the path of glass movement and a 720 inch (18 meters) longitudinal radius of curvature about an axis extending traversely of the path of glass movement.

In the above run, glass sheets having a 20 inch (50 centimeter) dimension traverse to the path of movement and a 28 inch (70 centimeter) dimension along the path of glass sheet movement and a thickness of 3/16 inch (5 millimeters) had their transverse depth of sag increased by 5 mils (0.13 millimeters) and their longitudinal depth of sag increased by 11 mils (0.28 millimeters) as a result of the significant cooling differential of the opposite surfaces.

In the above runs, the glass sheets were shaped to a given first configuration of concave elevation and then chilled more rapidly at their upper major surfaces than their lower major surfaces. Such treatment reduced the radius of curvature of said glass sheets so treated.

The present invention contemplates adjusting the absolute as well as the relative upward and downward cooling rates by controlling relative plenum pressures. Thus, a single configuration of rotating forming rolls of one traverse curvature arranged along a sweep line of a predetermined longitudinal curvature may be used to impart a first compound configuration to the glass sheets desired to be shaped to any one of several different configurations. Different final configurations can be obtained from a common first configuration by providing different arrangements of upper and lower plenum pressures that provide different cooling rates in the quenching section. Simple experimentation based on how much a glass sheet deviates from ultimate curvature (that is, whether it develops too much sag or too little sag after the correction of the first configuration) can "fine-tune" an adjustment. Generally, increasing the excess of upper plenum pressure relative to a lower plenum pressure or decreasing the deficiency of lower plenum pressure relative to an upper plenum pressure increases the sag and reduces the radius of curvature. On the other hand, decreasing the excess of upper plenum pressure or decreasing the deficiency of lower plenum pressure decreases the sag and increases the radius of curvature of concavely shaped sheets.

FIGS. 16 to 18 show variations of certain features of the first embodiment of the present invention. For example, in the alternate embodiment, all of the shafts 40 that rotatably support additional lower forming rolls 67 to 77 of the third series of rolls are supported equal vertical distances above the lower longitudinal side members 82 by using shims 78 of equal height. The rotatable forming rolls 53 to 65 of the second series of rolls in the first portion (not shown in FIG. 16) are also supported on shafts 40 (not shown) at the same level by using corresponding shims 78 of equal thickness to space the second series of rolls a uniform distance over the horizontal support members 47 and 48 instead of using shims of different thicknesses to provide spacings of different distances as illustrated in FIGS. 1 and 2. Such an arrangement produces a cylindrical bend or a bend of non-uniform radius of curvature about an axis extending along the path of glass movement.

Another variation shown in the embodiment of FIGS. 16 to 18 is the replacement of upper shims 85 with open vertical adjustment means each comprising a pair of externally threaded rods 185 rigidly attached at their bottom ends to a corresponding mounting bracket 84 and extending through one of many apertures in the upper horizontal longitudinally extending members 81. An adjustment nut 186 is threaded about the externally threaded rod on each side of the member 81 and suitable lock nuts are provided to abut the adjustment nuts 186. Such a construction facilities adjustment of spacing between corresponding upper and lower rolls of the third and fourth series or removal of a single upper forming roll when such maintenance is needed.

The previously described embodiments relate to method and apparatus for shaping glass sheets from a flat to various curved configurations that incorporate at least one component of curvature that is concave in elevation. It is also within the gist of the present invention to change the shape of glass sheets from a flat to a curved configuration that includes at least one component of curvature that is convex in elevation. This latter convex curvature component may be combined with a second component that is either convex or concave in elevation or essentially flat. In all instances, the forming rolls, the conveyor rolls and the quenching rolls are rigidly supported in apparatus for producing these alternate shapes.

For example, to produce a transverse curve of convex elevation, the roll forming section of the first embodiment is modified to provide, in combination with the first series of additional conveyor rolls 22 of cylindrical configuration that are rigidly supported in a desired longitudinally oblique path, a second series of rigidly supported rolls of convex transverse configuration. In this embodiment, the third series of rigidly supported rolls (the lower forming rolls in the second portion of the roll forming section) are convex in transverse elevation and the fourth series of rigidly supported rolls (the upper forming rolls aligned above the third series of rolls) have transverse configurations that are concave in transverse elevation and complementary to the transverse configurations of the lower forming rolls in the third series. In addition, the fourth series of rolls are closely spaced over the corresponding rolls in the third series, particularly the downstream pair. Furthermore, in this alternative embodiment, the quench rolls in the upstream portion of the quenching section have a transverse elevational configuration of convex elevation.

When it is intended to develop a transverse curvature of convex elevation in glass sheets, the first series of conveyor rolls is tilted downward as in the first embodiment, thereby exposing each longitudinal increment of a heat-softened glass sheet to alternate support by a roll of cylindrical configuration on progressively lesser lengths of transversely extending straight lines of support and progressively greater lengths of transversely extending curved lines of support of convex elevation until the heat-softened glass sheet is supported at longitudinally spaced lines of support having a transversely extending convex elevation. The upper forming rolls of concave elevation are rigidly supported in closely spaced relation over the corresponding lower forming rolls of convex elevation of complementary curvature so as to provide one or more barriers at the downstream end of the roll forming section to inhibit the backward flow of quenching medium to the upstream portion of the roll forming section as in the first embodiment.

In order to provide a longitudinal component of curvature of convex elevation, the second and third series of rolls and the quench rolls in the upstream portion of the quenching section are arranged in longitudinally spaced relation along a longitudinal path of convex elevation of substantially constant radius of curvature. The transverse shape of the forming rolls of the second and third series arranged along the longitudinal path of convex elevation of substantially constant radius of curvature are either all convexly curved in transverse elevation or all concavely curved in transverse elevation or all cylindrically shaped. The quench rolls in the upstream portion of the quenching section are similarly shaped in transverse elevation.

In all instances, after the glass sheets have their surfaces hardened by exposure to the blasts of tempering medium in the upstream portion of the quenching section, the shaped glass sheets can continue on a longitudinal path through the quenching and cooling sections that departs from the longitudinally curved path of convex elevation. However, as is the case with longitudinal paths of concave elevation, it is necessary to transport the glass sheets from forming rolls to forming rolls to quench rolls along a longitudinally curved path of substantially constant radius of curvature until such a location within the quenching section that the glass surface is sufficiently hard to enable the glass to transfer to additional quenching rolls disposed along a longitudinal path that departs from the constant radius of curvature without damaging the glass surface.

The use of roll forming apparatus containing a minimum of moving parts has resulted in a more uniform shape imparted to each sheet of any given production pattern and has resulted in high speed mass production. In addition, time needed for repair and maintenance and to change the apparatus to a different pattern has been minimized by the present invention.

The form of the invention shown and described in this disclosure represents an illustrative preferred embodiment and certain modifications thereof. It is understood that other changes can be made by providing various subcombinations of elements of the illustrative embodiments, such as providing cylindrically shaped forming rolls disposed with quench conveyor rolls of cylindrical shape along a longitudinally extending curved path of substantially constant radius of curvature to enhance the uniformity of shape of a longitudinally extending component of curvature, or providing rigidly supported upper and lower forming rolls closely spaced to one another immediately upstream of a quenching section to retard blow back and to control glass sheet shaping regardless of whether the shape imparted to the glass sheets comprises only a traverse component of curvature, only a longitudinal component of curvature or a combination of said components, for example, without departing from the gist of the invention as defined by the claimed subject matter which follows.

We claim:

1. Apparatus for shaping and tempering glass sheets to a shape comprising a longitudinal component of curvature having a substantially constant radius of curvature comprising a roll forming section and a quenching section disposed in end to end relation, a series of longitudinally spaced forming rolls each extending transversely of a longitudinal path of movement of substantially constant radius of curvature in said roll forming section, a series of additional shaped rolls longitudinally spaced from one another, each extending transversely of a continuation of said path of movement of substantially constant radius of curvature in said quenching section, means for supplying quenching medium to said quenching section, means for delivering discrete glass sheets at a temperature sufficient for shaping to said roll forming section, means for rigidly supporting said rolls along said path of movement in said roll forming section and along said continuation of said path in said quenching section and means for rotating said rolls whereby said discrete glass sheets develop a longitudinal component of curvature of substantially constant radius of curvature with minimum deviation in surface smoothness as they are shaped and tempered.

2. Apparatus as in claim 1, wherein said rolls in said roll forming section and in said quenching section have a common transversely shaped configuration, whereby said heat-softened glass sheets develop a complex shape incorporating a transverse component of curvature in addition to said longitudinal component of curvature.

3. Apparatus as in claim 1, wherein said series of forming rolls comprises forming rolls extending transversely of an upstream portion of said roll forming section and additional forming rolls in a downstream portion of said roll forming section, said additional forming rolls in said downstream portion comprising a series of lower forming rolls each extending transversely of said path of substantially constant radius of curvature, a series of upper forming rolls including a roll vertically aligned with each of said lower forming rolls, and means for rigidly supporting each of said upper forming rolls in fixed vertically spaced relation to its corresponding lower forming roll at a distance slightly more than the thickness of glass sheets conveyed between said upper and lower forming rolls.

4. Apparatus for shaping a series of heat-softened glass sheets by the roll forming process comprising:
a roll forming station adjacent to the exit end of a glass sheet heating furnace, including an alternating series of conveyor rolls and forming rolls, both supported with stationary, horizontal axes extending parallel to each other and transversely to a horizontal, longitudinal path of glass sheet travel defined by said rolls, said conveyor rolls being of cylindrical configuration and aligned to form a transversely flat first path of support for glass sheets, said forming rolls having transverse curvature and aligned to form a transversely curved second path of support for glass sheets, said flat first path intersecting said curved second path, with the flat first path supported at a higher elevation than a majority of the curved second path at the upstream end of the roll forming station adjacent the furnace, and the downstream portion of the flat first path supported at a lower elevation than a majority of the curved second path, and means to rotate the conveyor rolls and the forming rolls to convey glass sheets from the furnace in the downstream direction through the roll forming station, whereby support for each glass sheet gradually transfers from the conveyor rolls to the forming rolls as the glass sheet passes through the roll forming station and sags into conformity with the transverse curvature of the forming rolls.

5. The apparatus of claim 4 wherein said transverse curvature of the forming rolls is concave in elevation.

6. The apparatus of claim 5 wherein the path defined by the forming rolls is also concavely arcuate in the longitudinal direction.

7. The apparatus of claim 4 wherein said forming rolls are segmented.

8. The apparatus of claim 4, further including an additional section of the forming station downstream from said alternating series of conveyor rolls and forming rolls, comprising an additional set of transversely curved forming rolls defining an extension of said curved second path of support for glass sheets, and a set of upper forming rolls of complementary curvature overlying said additional set of forming rolls and rigidly spaced therefrom at a fixed distance slightly greater than the thickness of the glass sheets.

9. The apparatus of claim 8 wherein said additional set of forming rolls and said upper forming rolls are segmented.

10. The apparatus of claim 9 wherein a portion of said additional forming rolls and said upper forming rolls have glass-contacting surfaces whose transverse lengths extend across less than the full transverse widths of said extended second path of glass sheet support.

11. The apparatus of claim 4 further including a quenching station adjacent to the downstream end of said roll forming station and including transversely curved conveyor rolls for conveying shaped glass sheets through the quenching station, and means for supplying quenching medium against the opposite surfaces of the shaped glass sheets.

12. The apparatus of claim 11 wherein said curved conveyor rolls in the quenching station are aligned with the forming rolls in the forming station to form an extension of said second path of glass support and defining therewith a path having a smooth longitudinal curvature of substantially constant radius of curvature.

13. The apparatus of claim 4 wherein said forming rolls are aligned so as to define a longitudinally straight second path.

14. A method of shaping glass sheets by roll forming comprising:
heating each glass sheet to a softened condition,
conveying each heated sheet in a longitudinal direction through a roll forming station on alternate cylindrical conveyor rolls and transversely curved forming rolls, all having parallel, horizontal, stationary axes of rotation:
initially supporting the majority of the transverse width of the glass sheet on the conveyor rolls, and as the glass sheet passes along the roll forming station, progressively transferring support of the glass sheet to the curved forming rolls until a majority of the transverse width of the glass sheet is supported by the forming rolls; and
as the support is being transferred to the forming rolls, permitting the glass sheet to sag by the force of gravity into substantial conformity with the transverse curvature of the forming rolls.

15. The method of claim 14 wherein, after each glass sheet has sagged into substantial conformity with the transverse curvature of the forming rolls, the glass sheet is passed between a set of additional curved forming rolls and a set of upper forming rolls of complementary curvature closely spaced thereabove a distance slightly greater than the thickness of the glass sheets.

16. The method of claim 14 wherein, subsequent to passing through the forming station, the glass sheets are quenched by differentially cooling their opposite major surfaces at rates sufficiently different to alter the configuration imparted to said sheets by the forming rolls.

17. An apparatus for shaping a series of glass sheets by the roll forming process comprising means for delivering one glass sheet at a time at a temperature above its deformation temperature to a roll forming section, said section comrpising a first series of rigidly supported longitudinally spaced rotatable conveyor rolls of cylindrical configuration each extending transversely in a horizontal plane, a second series of rigidly supported rotatable forming rolls of curved transverse configuration, each roll of said second series being located in spaced relation between two adjacent conveyor rolls of said first series along a longitudinal path extending lengthwise of said forming section and means supporting the first series of conveyor rolls in an obliquely downward direction relative to the longitudinal path defined by said second series of forming rolls, said supporting means comprising a framelike structure interconnecting said first series of conveyor rolls, and means to pivot said framelike structure about an axis defined by the first conveyor roll of said first series between an oblique downward orientation defining said obliquely downward direction for operation and another orientation for storage.

* * * * *